UNITED STATES PATENT OFFICE 2,408,961

TRISAZO METALLIZABLE DYESTUFFS

Fritz Straub, Kaiseraugst, near Basel, and Jakob Brassel and Hans Mayer, Basel, Switzerland, assignors to the firm Society of Chemical Industry in Basle, Basel, Switzerland No Drawing. Application September 10, 1943, Serial No. 501,868. In Switzerland September 2, 1942

6 Claims. (Cl. 260—172)

The present invention is concerned with azo dyestuffs containing at least two azo groups. More particularly it provides valuable new dyestuffs of the type capable of forming complex metal compounds. Further objects will appear as the specification proceeds.

It is well known in the art that resorcinol (i. e. 1:3-dihydroxybenzene) is capable of coupling more than once, in view of the two hydroxyl groups present in the benzene nucleus. A considerable number of azo-dyestuffs has been prepared in which resorcinol is used as a twice-coupling azo component, comprising direct dyeing (substantive), mordant dyeing, and acid wool dyestuffs etc. Resorcinol is a comparatively cheap product because it is easily obtainable on an industrial scale, and therefore there is nothing to prevent its use in the manufacture of dyestuffs.

In contradistinction to this, 1:3-dihydroxynaphthalene is not so easily obtainable and has not found any industrial use as far as is known. It was to be expected that the fused-on benzene ring in the 1:3-dihydroxynaphthalene (=5:6-benzo-1:3-dihydroxy benzene) would render coupling reactions substantially more difficult than with resorcinol and it could not be expected offhand that 1:3-dihydroxynaphthalene would be capable at all of coupling twice. Moreover there was nothing to induce any expert to try 1:3-dihydroxybenzene in the manufacture of disazo and polyazo dyestuffs as component coupling twice. Contrary to every expectation, applicants have found it worth while doing so, because the dyestuffs thus obtained have unexpected superior properties in many respects.

It has now been found that valuable disazo and polyazo dyestuffs, and particularly trisazo dyestuffs to which the appended claims are directed, may be obtained if for their synthesis 1:3-dihydroxy-naphthalene is used as twice coupling azo component and if agents yielding metal are caused to react with the dyestuffs thus obtained, if desired.

For the synthesis of the dyestuffs the known diazo components may be used according to the present process, for instance such of the benzene, naphthalene and particularly also of the benzidine series. In many cases also such diazo compounds may be used with advantage which possess lake-forming groups, for example, a hydroxyl group, a carboxyl group, an alkoxy group or an alkoxy-carboxy group in ortho-position to the diazo group. Thus for example, benzidine and its substitution products come into consideration as diazo components, i. e., para-nitraniline, 4-amino-4'-nitrodiphenylamino-2'-sulfonic acid, sulfanilic acid, metanilic acid, and the halogen substitution products thereof, aminophenols such as 5-nitro-2-amino-1-phenol, 4-nitro-, 4-methyl- and 4-chloro-2-amino-1-phenol-6-sulfonic acid, 6-nitro- or 6-chloro-2-amino-1-phenol-4-sulfonic acid, 2-amino-1-phenol-6-carboxylic acid-4-sulfonic acid, 4-nitro-2-amino-1-benzoic acid, 4:6-dinitro-2-amino-1-phenol, 4-methyl-2-amino-1-phenol-5-sulfonic acid, 3:6-dichloro-2-amino-1-phenol-4-sulfonic acid, 1-amino-2-hydroxy-naphthalene-4-sulfonic acid and the substitution products thereof. Coupling with an 1:3-dihydroxynaphthalene may be effected in an alkaline medium, e. g. alkaline with bicarbonates, carbonates or in a caustic alkaline medium. If desired two molecular proportions of diazo components may be combined in one step or successively in two steps with 1:3-dihydroxynaphthalenes.

When using two identical or different diazo components of the said kind, among which only one needs to possess a lake-forming group, a great number of very valuable disazo dyestuffs are obtained.

In many instances there are preferably used diazo components containing azo groups which are obtainable for instance by coupling a diazo compound with a middle component. Particularly valuable dyestuffs are in many cases obtained by using diazo compounds which are obtained by a one sided coupling of tetrazotized diamines, particularly of the benzidine series, with coupling components. In this case particularly also such coupling components come into consideration which possess lake-forming groups such as the salicylic acid grouping, e. g., salicylic acid and its substitution products capable of coupling.

A series of particularly valuble trisazo dyestuffs is obtained if a 1:3-dihydroxynaphthalene is coupled on the one hand with a diazotized amine of the aryl series containing in ortho-position to the diazo group a lake-forming group and on the other hand with a diazoazo compound, which is obtained by one sided coupling of a tetrazotized benzidine with an ortho-hydroxy-aryl carboxylic acid capable of coupling. The coupling may be conducted with advantage in the said sequence or also in a reverse order. In this manner there is obtained a series of predominantly brown dyestuffs of good fastness properties.

The dyestuffs obtainable according to the present process may be used for dyeing and printing the most various animal and in particular cellulosic fibers. Many of the disazo dyestuffs produced according to the present process are for example suitable for wool, silk and particularly leather, whereas, when using substantive components, disazo and principally polyazo dyestuffs are obtained, which are predominantly useful for cotton, linen, rayon and staple fibers from regenerated cellulose.

If by a suitable choice of the components care has been taken that the dyestuff contains lake-forming groups in the molecule, these dyestuffs can be converted in substance, in the dye-bath or on the fiber into complex metal compounds. In this case, for example, chromium, cobalt, iron and particularly copper are coming into consideration as suitable metals. The conversion into such metal complex compounds may appropriately be conducted in substance if the dyestuff, due to the presence of a sufficient number of groups promoting solubility, e. g. sulfonic acid groups, possesses also in the metallized state still a sufficient solubility. Many of the metalliferous dyestuffs thus obtained are remarkably suitable for the dyeing of leather. Those dyestuffs, the complex metal compounds of which are sparingly soluble to insoluble may with advantage be dyed according to a known after-metallizing process, for example the after-coppering method. Advantageous use, particularly in the dyeing of cellulosic fibers, may be made in this case of the one-bath after-coppering process known by the U. S. Patent 2,148,659 (cf., also French Patent 809,893), in which process dyeing followed by coppering is effected in the same bath. In this case complex copper tartrates or similar metal compounds, stable towards alkalies, are used with advantage in a weakly alkaline medium.

The following examples illustrate the invention, the parts being by weight unless otherwise stated:

Example 1

9.2 parts of benzidine are tetrazotized as usual with hydrochloric acid and sodium nitrite. The clear tetrazo solution is then combined during 1 hour at 5–6° C. with a solution of 8 parts of salicylic acid and 20 parts of sodium carbonate in 80 parts of water. A brown-orange suspension of the diazoazo compound is thus obtained.

9.4 parts of 2-amino-phenol-4-solfamide are diazotized with hydrochloric acid and sodium nitrite and the diazo suspension added within ½ hour at 4–6° C. to a solution of 8.5 parts of 1:3-dihydroxynaphthalene, 8 parts of sodium carbonate and 5 parts by volume of caustic soda solution of 30 per cent. strength in 50 parts of water. After stirring for 1 hour at 5–8° C. coupling is complete. The dyestuff of the formula

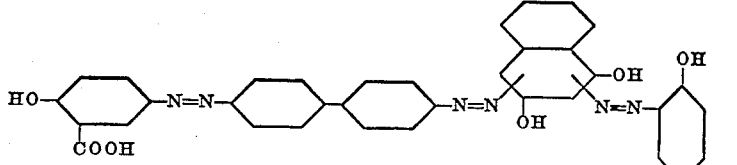

is separated by addition of 30 parts of sodium chloride and filtered off. It is introduced in the form of a paste into the suspension of the diazoazo compound prepared according to the first paragraph. The whole is coupled for one hour at 11–12° C. and for 50 hours at 18–20° C., whereupon the temperature is raised to 90° C. and the trisazo dyestuff formed filtered from the hot reaction mixture. When dry it is a dark powder which dissolves in water and sodium carbonate solution to a yellow-brown, in dilute caustic alkalies to a brown-red and in concentrated sulfuric acid to a violet solution. Cotton is dyed havana brown shades which are fast to washing when dyed and coppered according to the one bath process.

Example 2

11.2 parts of 4-chloro-2-amino-1-phenol-6-sulfonic acid are diazotized in the usual manner with hydrochloric acid and sodium nitrite. The diazo solution is added within ½ hour at 4–6° C. to a solution of 8.5 parts of 1:3-dihydroxynaphthalene, 8 parts of sodium carbonate and 2 parts of sodium hydroxide in 50 parts of water. The whole is stirred for one hour at 5–8° C. and for 4 hours at 15–20° C. The dyestuff is separated by adding 40 parts of sodium chloride. It is introduced in the form of a paste into the diazoazo compound from benzidine and salicylic acid prepared according to Example 1. The whole is coupled for 1 hour at 10–12° C. and for 50 hours at 18–22° C., heated after diluting the coupling mixture with 100 parts of water to 85° C. and the formed trisazo dyestuff of the formula

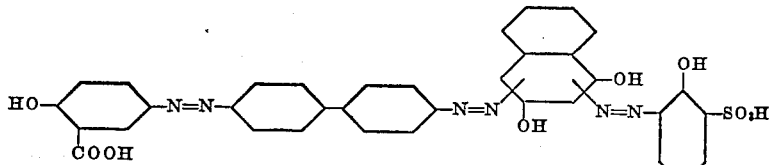

is then filtered off. When dry it is a dark powder which dissolves in water to a red brown, in dilute alkalies to a brown and in concentrated sulfuric acid to a violet solution, from which vegetable fibers are dyed fast brown shades, when dyed and coppered according to the one bath process.

A similar dyestuff is obtained if in this example the 11.2 parts of 4-chloro-2-aminophenol-6-sulfonic acid are replaced by 11.7 parts of 4-nitro-2-amino-1-phenol-6-sulfonic acid or by 9.45 parts of 2-amino-1-phenol-4-sulfonic acid.

Example 3

13.8 parts of 1:3:6-trichloro-2-aminobenzene-4-sulfonic acid are diazotized in the usual manner with hydrochloric acid and sodium nitrite. The suspension of the diazo compound is caused to react with 20 parts of crystallized sodium acetate and the whole is stirred at ordinary temperature until the chlorine atom in one-position is replaced by the hydroxyl group, which generally is the case after a few hours. The thus dissolved ortho-hydroxy-diazo compound is added within ½ hour at 5–8° C. to a solution of 8 parts of 1:3-dihydroxynaphthalene, 18 parts of sodium carbonate and 5 parts of caustic soda solution of 30 per cent. strength in 100 parts of water. The whole is stirred for 1 hour at 5–10° C., then for 20 hours at 15–20° C. and the monoazo dyestuff thus formed is separated by addition of sodium chloride. It is introduced, while still moist, into the suspension of the diazo compound from benzidine and salicylic acid, obtained according to Example 1. The whole is coupled for one hour at 10–12° C. and then for 24 hours at 18–20° C. heated to 90° C. and the trisazo dyestuff thus formed of the formula

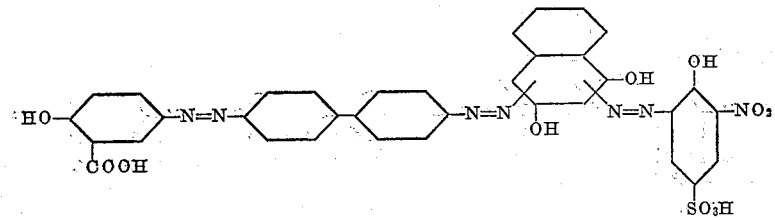

to 85° C. after diluting the coupling mixture with 100 parts of water and the formed trisazo dyestuff of the formula is then filtered off. When dry it is a dark powder which dissolves in water and in dilute sodium carbonate solution to a Bordeaux red, in dilute caustic alkalies to a violet brown and in concentrated sulfuric acid to a blue-red solution, from which vegetable fibers are dyed fast brown shades, when dyed and coppered according to the one bath process.

If 3:3'-dichloro-4:4'-diaminodiphenyl is used instead of benzidine in preparing the diazoazo compound mentioned above, a similar dyestuff is obtained.

*Example 5*

11.6 parts of 2-amino-1-phenol-6-carboxylic acid-4-sulfonic acid are diazotized in a hydrochloric acid medium in the usual manner with sodium nitrite at 15–20° C. The diazo compound is added within ½ hour at 4–6° C. to a solution

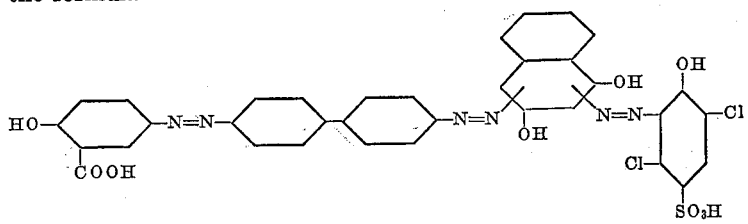

filtered from the hot reaction mixture after addition of sodium chloride. When dry it is a dark powder, which dissolves in water and dilute alkalies to a brown, in concentrated sulfuric acid to a violet solution and dyes vegetable fibers brown shades which are fast to washing and light, when dyed and coppered according to the one bath process.

*Example 4*

11.7 parts of 6-nitro-2-aminophenol-4-sulfonic acid are diazotized as usual at 10–15° C. with hydrochloric acid and sodium nitrite. The diazo solution is added within ½ hour at 4–6° C. to a solution of 8.5 parts of 1:3-dihydroxynaphthalene, 8 parts of sodium carbonate and 2 parts of sodium hydroxide in 50 parts of water. The whole is stirred for one hour at 5–8° C. and the monoazo dyestuff separated by addition of 60 parts of sodium chloride. It is introduced in the form of a paste into the diazoazo compound from benzidine and salicylic acid prepared according to Example 1. The whole is coupled for 1 hour at 10–12° C. and for 50 hours at 18–22° C. heated of 8.5 parts of 1:3-dihydroxynaphthalene, 8 parts of sodium carbonate and 2 parts of sodium hydroxide in 50 parts of water. The whole is stirred for 1 hour at 5–8° C. and for 14 hours at 10–15° C. and the monoazo dyestuff is separated by addition of 60 parts of sodium chloride. It is introduced in the form of a paste into the diazoazo compound, prepared according to Example 1. The whole is coupled for one hour at 10–12° C. and for 50 hours at 18–22° C., heated to 85° C. after diluting the coupling mixture with 100 parts of water, and the formed trisazo dyestuff of the formula

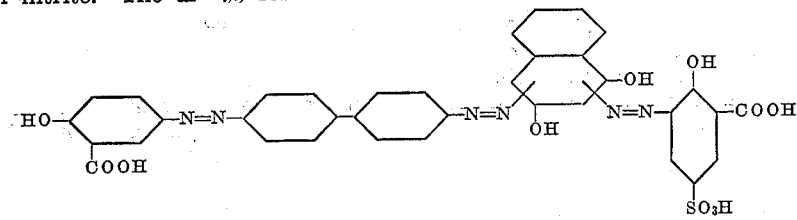

is filtered off. When dry it is a dark powder, which dissolves in water to an orange-brown, in dilute sodium carbonate solution to a yellow-brown, in dilute caustic alkalies to a brown red and in concentrated sulfuric acid to a violet solution, which dyes vegetable fibers fast brown shades, when dyed and coppered according to the one bath process.

*Example 6*

7.7 parts of 5-nitro-2-amino-1-phenol are diazotized as usual with hydrochloric acid and sodium nitrite. The suspension of the diazo compound is added within ½ hour at 4–6° C. to a solution of 8.5 parts of 1:3-dihydroxynaphthalene, 8 parts of sodium carbonate and 2 parts of sodium hydroxide in 50 parts of water. The whole is stirred for one hour at 5–8° C. and the monoazo dyestuff is separated by addition of 40 parts of sodium chloride. It is introduced in the form of a paste into the diazoazo compound, prepared according to Example 1. The whole is coupled for 1 hour at 10–12° C. and for 24 hours at 18–22° C., heated to 95° C. after diluting the coupling mixture with 100 parts of water and the formed trisazo dyestuff of the formula

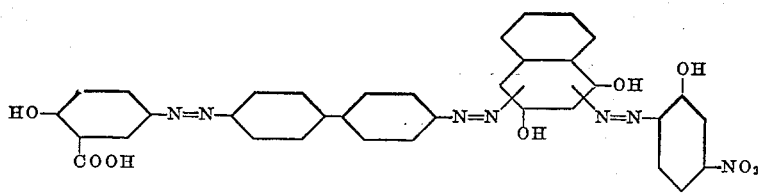

is filtered off. When dry it is a dark powder which dissolves in water and sodium carbonate solution to a red brown, in dilute caustic alkalies to a violet brown and in concentrated sulfuric acid to a violet solution from which vegetable fibers are dyed fast brown shades when dyed and coppered according to the one bath process.

Example 7

9.1 parts of 4-nitro-2-amino-1-benzoic acid are diazotized in a hydrochloric acid medium in the usual manner with sodium nitrite. The suspension of the diazo compound is added within ½ hour at 4–6° C. to a solution of 8.5 parts of 1:3-dihydroxynaphthalene, 13 parts of sodium carbonate and 2 parts of sodium hydroxide in 80 parts of water. The whole is stirred during 1 hour at 5–8° C. and the formed monoazo dyestuff is filtered off. It is introduced in the form of a paste into the diazoazo compound, prepared according to Example 1. The whole is coupled for 1 hour at 5–8° C. and for 24 hours at 18–22° C., heated to 95° C. after diluting with 100 parts of water and the formed trisazo dyestuff of the formula

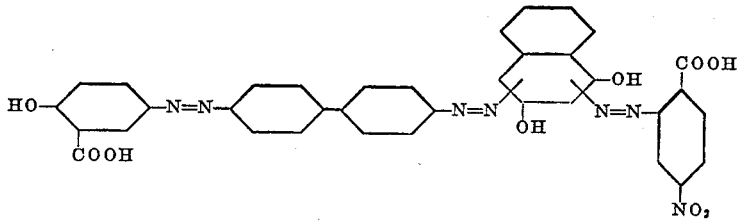

is filtered off. When dry it is a dark powder which dissolves in water and dilute sodium carbonate solution a yellow brown, in dilute caustic alkalies to an orange brown and in concentrated sulfuric acid to a Bordeaux red solution, from which vegetable fibers are dyed fast yellow brown shades when treated and coppered according to the one bath process.

Example 8

22.7 parts of a paste containing 55 per cent of diazotized 1-amino-2-hydroxynaphthalene-4-sulfonic acid (corresponding to 11.9 parts of 1-amino-2-hydroxynaphthalene-4-sulfonic acid) are introduced in the course of ½ hour at 4–6° C. into a solution of 8.5 parts of 1:3-dihydroxynaphthalene, 8 parts of sodium carbonate and 2 parts of sodium hydroxide in 100 parts of water. The whole is stirred for one hour at 5–8° C., 10 parts of sodium chloride are added and stirring is continued for one hour at 10–15° C. The formed monoazo dyestuff is filtered off and introduced in the form of a paste into the diazoazo compound from benzidine and salicylic acid, prepared according to Example 1. The whole is coupled for 1 hour at 10–12° C. and for 48 hours at 18–22° C., heated to 80° C. after diluting the coupling mixture with 100 parts of water and the trisazo dyestuff of the formula

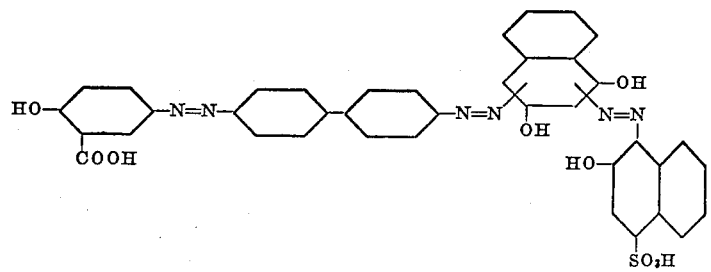

is separated by addition of 20 parts of sodium chloride. When dry it is a dark powder, which dissolves in water and sodium carbonate solution to a brown, in dilute caustic alkalies to an orange brown and in concentrated sulfuric acid to a blue red solution, from which vegetable fibers are dyed fast orange brown tints, when dyed and coppered according to the one bath process.

Example 9

25.5 parts of a paste containing 58 per cent of 6-nitro-1-diazo-2-hydroxy-naphthalene-4-sulfonic acid (corresponding to 14.2 parts of 6-nitro-1-amino-2-naphthol-4-sulfonic acid) are introduced within ½ hour at 4–6° C. into a solution of 8.5 parts of 1:3-dihydroxynaphthalene, 18 parts of sodium carbonate and 2 parts of sodium hydroxide in 100 parts of water. The whole is stirred for 1 hour at 5–8° C. 10 parts of common salt are added and stirring is continued for 1 hour at 10–15° C. The formed monoazo dyestuff is filtered off and introduced in the form of a paste into the diazoazo compound prepared according to Example 1. The mixture is coupled for 1 hour at 10–12° C. and for 48 hours at 18–22° C., heated to 75° C. and the trisazo dyestuff of the formula is filtered from the rot reaction mixture after addition of common salt. When dry it is a dark powder which dissolves in water and dilute sodium carbonate solution to a brown, in dilute caustic alkalies to a brown red and in concentrated sulfuric acid to a violet solution from which vegetables fibers are dyed brown shades fast to

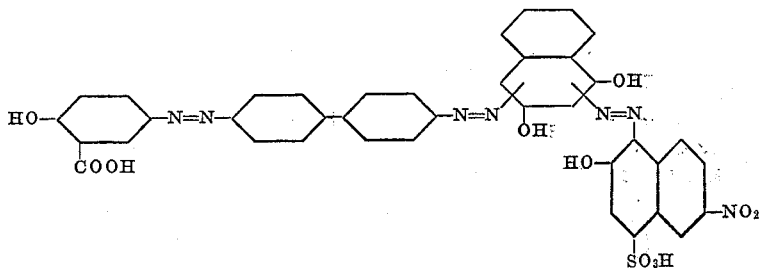

is separated by the addition of 20 parts of common salt. When dry it is a dark powder which dissolves in water and sodium carbonate solution to a brown, in dilute caustic alkalies to a red tinged brown and in concentrated sulfuric acid to a violet solution from which vegetable fibers are dyed fast orange brown shades, when dyed and coppered according to the one bath process.

Example 10

9.2 parts of benzidine are tetrazotized in the usual manner with hydrochloric acid and sodium nitrite. The clear tetrazo solution is mixed during 1 hour at 4–6° C. with a solution of 8 parts of salicylic acid and 20 parts of anhydrous sodium carbonate in 80 parts of water. There is obtained a brown orange suspension of the intermediate compound benzidine→salicylic acid.

11.65 parts of 6-nitro-2-amino-1-phenol-4-sulfamide are diazotized in a hydrochloric acid medium in the usual manner with sodium nitrite. The diazo compound obtained is introduced within ½ hour at 4–6° C. into a solution of 8.0 parts of 1:3-dihydroxy-naphthalene, 8 parts of anhydrous sodium carbonate and 5 parts by volume of caustic soda solution of 30 per cent. strength in 50 parts of water. The whole is stirred for 2 hours at 5–10° C., then for 15 hours at 15–20° C. and the formed monoazo dyestuff is separated by filtration, if necessary after addition of common salt. It is introduced in the form of a paste into the suspension of the diazoazo compound from benzidine and salicylic acid, prepared as described above. The mixture is coupled for 1 hour at 10–12° C. and for 24 hours at 18–20° C., heated to 90° C. and the formed triazo dyestuff of the formula washing and to light when dyed and coppered according to the one bath process.

Example 11

10.15 parts of 2-amino-4-methyl-1-hydroxybenzene sulfonic acid (obtained by boiling 2-nitro-4-methyl-1-hydroxybenzene with bisulfite in known manner) are diazotized in a hydrochloric acid medium in the usual manner with sodium nitrite. The diazo compound obtained is introduced in the course of ½ hour at 4–6° C. into a solution of 8 parts of 1:3-dihydroxynaphthalene, 8 parts of anhydrous sodium carbonate and 5 parts by volume of caustic soda solution of 30 per cent. strength in 50 parts of water. The whole is stirred for 1 hour at 5–10° C., then for 1 hour at 10–15° C. and the formed monoazo dyestuff is separated by filtration after addition of common salt. It is introduced in the form of a paste into the suspension of the diazoazo compound from benzidine and salicylic acid. The mixture is coupled for 1 hour at 10–12° C. and for 20 hours at 18–20° C., heated to 70–80° C. and the formed triazo dyestuff of the formula

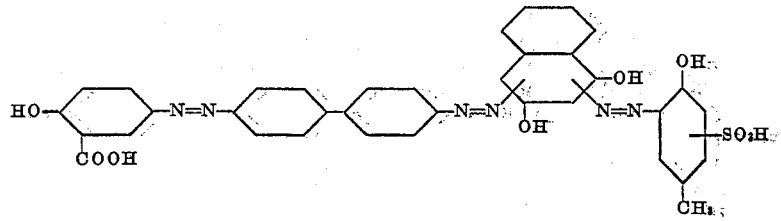

is filtered from the hot reaction mixture after addition of common salt. When dry it is a dark powder which dissolves in water and dilute sodium carbonate solution to a yellow brown, in dilute alkalies to a red brown and in concentrated sulfuric acid to a violet solution from which vegetable fibers are dyed brown shades fast to washing and light, when dyed and coppered according to the one bath process.

Example 12

9.45 parts of 2-amino-1-phenol-4-sulfonic acid are diazotized with hydrochloric acid and sodium

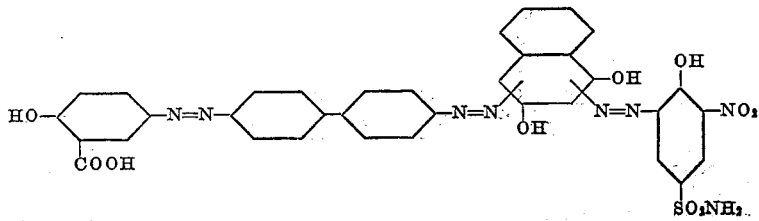

nitrite and the diazo suspension is introduced in the course of ½ hour at 4–6° C. into a solution of 8.0 parts of 1:3-dihydroxynaphthalene, 8 parts of anhydrous sodium carbonate and 5 parts by volume of caustic soda solution of 30 per cent. strength in 50 parts of water. The whole is stirred for 2 hours at 510° C., then for 15 hours at 15–20° C. and the formed monoazo dyestuff is separated by addition of common salt and dilute acetic acid. It is introduced in the form of a paste into the suspension of the diazoazo compound from benzidine and salicyclic acid obtained as described in Example 10. The mixture is coupled for 1 hour at 10–12° C. and then for 24 hours at 18–20° C., heated to 90° C. and the formed trisazo dyestuff of the formula

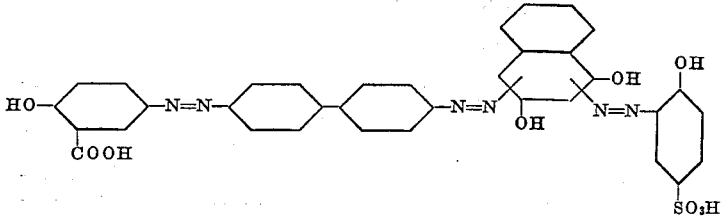

is filtered from the rot reaction mixture after addition of common salt. When dry it is a dark powder which dissolves in water and dilute sodium carbonate solution to a brown, in dilute caustic alkalies to a brown red and in concentrated sulfuric acid to a violet solution from which vegetable fibers are dyed brown shades fast to washing and light, when dyed and coppered according to the one bath process.

If 3:3′-dimethyl-4:4′-diaminodiphenyl or 3:3′-dimethoxy-4:4′-diaminodiphenyl is used instead of benzidine in preparing the diazoazo compound, similar dyestuffs are obtained.

Example 13

23.4 parts of 4-nitro-2-amino-1-phenol-6-sulfonic acid are diazotized in usual manner and coupled with 16 parts of 1:3-dihydroxynaphthalene in a solution alkaline with sodium carbonate and in the presence of 5.5 parts of freshly precipitated iron-(III)-hydroxide. When coupling is complete, the whole is heated for some time to 60–80° C. and the formed iron compound separated in a neutral medium and dried. It dyes vegetable tanned and chrome tanned leather brown violet shades.

22 parts of the above iron compound (of the dyestuff from diazotized 4-nitro-2-amino-1-phenol-6-sulfonic acid and 1:3-dihydroxynaphthalene) are dissolved in 200 parts of water and 15 parts of caustic soda solution of 30 per cent. strength, mixed with 15 parts of anhydrous sodium carbonate and coupled with the diazo compound from 6.9 parts of para-nitraniline prepared in the usual manner. The disazo dyestuff of the formula

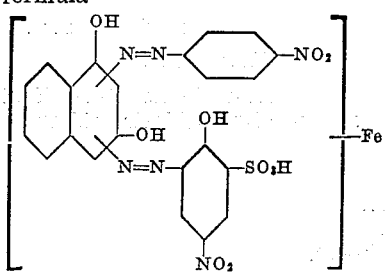

is precipitated in the usual manner and dried. It dyes leather olive-tinged, brown shades.

When using instead of para-nitraniline for example 1-aminonaphthalene-4-sulfonic acid, aminoazobenzene sulfonic acid or 4′-nitro-4-amino-diphenylamine-2′-sulfonic acid, there are obtained dark brown to black brown dyeing products. The dyestuff obtained when using the last named diazo component has the formula

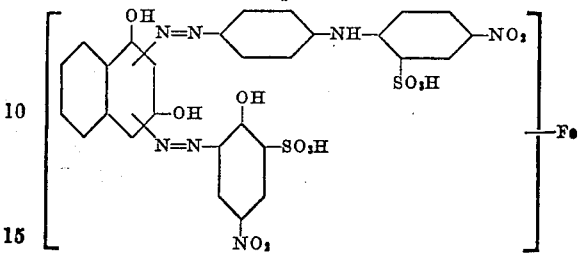

When replacing part of the iron by other metals, for example copper, the shade of the dyestuff is displaced to red tinged dark brown to reddish black brown. The order of succession of the diazo components to be used can also be reversed and similar dyestuffs are then obtained.

Example 14

A mixture consisting of 11.7 parts of 4-nitro-2-amino-1-phenol-6-sulfonic acid and 15.5 parts of 4′-nitro-4-aminodiphenylamine-2′-sulfonic acid is diazotized in usual manner and coupled in the presence of 2.1 parts of freshly precipitated iron-(III)-hydroxide and 0.6 part of copper hydroxide with 8.0 parts of 1:3-dihydroxynaphthalene in a medium alkaline with sodium carbonate. When the dyestuff formation is complete, the whole is heated for some time to 60–70° C. and the formed metal compound of the formula is then precipitated in usual manner and dried. A product is obtained which dyes leather powerful black brown shades.

Example 15

The dyestuff obtained from 29.5 parts of 6-nitro-1-diazo-2-hydroxynaphthalene-4-sulfonic acid and 16 parts of 1:3-dihydroxynaphthalene is heated to the boil in 800 parts of water and boiled for 24 hours in a reflux apparatus with a quantity of chromium sulfate corresponding to 10 parts of $Cr_2O_3$. The whole is then filtered to remove the precipitated chromium compound which is then dried at a moderate temperature. The dyestuff dyes leather red tinged blue shades.

50.7 parts of the above chromium compound are coupled in a solution alkaline with sodium carbonate with the diazo compound from 20.7 parts of 4-chloro-1-aminobenzene-3-sulfonic acid. A product is thus obtained of the formula

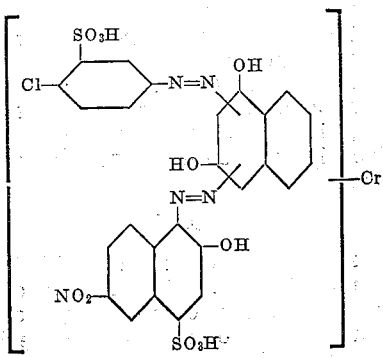

which dyes leather grey tinged blue shades. If the disazo dyestuff is first produced and subsequently coupled, there is obtained a similar dyestuff. By replacing 4-chloro-1-aminobenzene-3-sulfonic acid by 4-nitro-1-aminobenzene-2-sulfonic acid, 2'-nitro-4-aminodiphenylamine-4'-sulfonic acid or 4'-nitro-4-aminodiphenylamine-2'-sulfonic acid, dyestuffs are obtained which dye leather green tinged grey blue or black or olive black shades. Other metals, for example iron or manganese, lead to violet brown to dark brown shades.

*Example 16*

19.9 parts of 4:6-dinitro-2-amino-1-phenol are diazotized in usual manner and coupled in a medium alkaline with bicarbonate with 16 parts of 1:3-dihydroxynaphthalene. The monoazo-dyestuff is precipitated in crystalline form, then filtered and washed.

18.5 parts of this dyestuff are suspended in 200 parts of water and 15 parts of calcined sodium carbonate and mixed with the diazo compound from 15.4 parts of 2'-nitro-4-aminodiphenylamine-4'-sulfonic acid. When coupling is complete, the disazo-dyestuff is separated in usual manner.

34.5 parts of the disazo dyestuff are dissolved in water and heated for some time at 70-90° C. with 12.5 parts of copper sulfate and 14 parts of sodium acetate. The copper compound is then separated with common salt and dried at a moderate temperature. A dyestuff is thus obtained of the formula

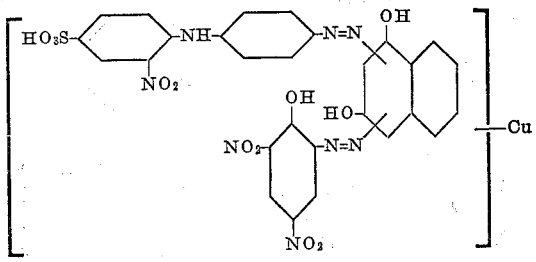

which dyes leather brown violet shades. When using as second diazo component 1-aminonaphthalene-4-sulfonic acid and instead of the copper sulfate a mixture of manganese and nickel sulfate, there is obtained a red brown dyestuff.

*Example 17*

The dyestuff obtained from 15.4 parts of diazotized 5-nitro-2-amino-1-phenol and 16 parts of 1:3-dihydroxynaphthalene in a medium alkaline with sodium carbonate is suspended in 500 parts of water and boiled for 15 hours in a reflux apparatus with a chromium solution consisting of 7.6 parts of freshly precipitated chromium hydroxide, 15 parts of tartaric acid and 27 parts of caustic soda solution of 30 per cent. strength. The dyestuff is salted out, filtered and dried. The chromium compound dyes vegetable tanned and chrome tanned leather deep blue shades. The leather is dyed with a good penetration.

19 parts of the above chromium compound are coupled in a medium alkaline with sodium carbonate with the diazo compound from 8.7 parts of 4-aminobenzene sulfonic acid. The dyestuff obtained of the formula

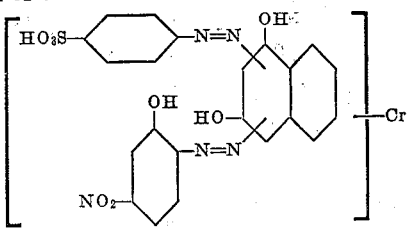

is freely soluble in water and dyes leather green tinged blue shades. By replacing the sulfanilic acid for example by aniline-2:5-disulfonic acid, a similar dyestuff is obtained.

*Example 18*

18 parts of the iron compound of the dyestuff from diazotized 4-nitro-2-amino-1-phenol and 1:3-dihydroxynaphthalene are coupled in a medium alkaline with sodium carbonate with the diazo compound from 11.7 parts of 4-nitro-2-amino-1-phenol-6-sulfonic acid. When the formation of dyestuff is complete, the solution is neutralized at 60° C. and treated for some time with a mixture of 4 parts of copper sulfate and 1.3 parts of iron-(III)-chloride. The dyestuff of the formula

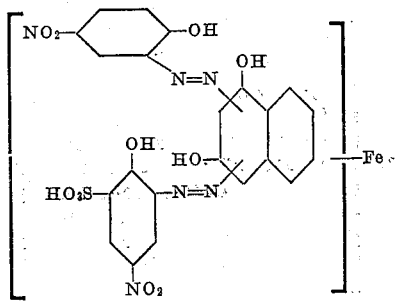

is precipitated by addition of sodium chloride, then filtered and dried at a moderate temperature. There is obtained a brown black powder which dissolves in water and dilute sodium carbonate solution to a deep brown solution and dyes leather powerful red tinged dark brown shades.

When replacing the copper sulfate by nickel sulfate, a slightly more yellow dyestuff is obtained.

When using the corresponding quantity of 4:6-dinitro-2-amino-1-phenol instead of the 4-nitroaminophenol, a blackish violet brown dyestuff is obtained.

*Example 19*

22 parts of the iron compound of the dyestuff from diazotized 6-nitro-2-amino-1-phenol-4-sulfonic acid and 1:3-dihydroxynaphthalene are coupled in a medium alkaline with sodium carbonate with the diazo compound from 9.9 parts of 4:6-dinitro-2-amino-1-hydroxybenzene. The whole is mixed with a solution consisting of 4.5 parts of iron-(III)-chloride, 2 parts of tartaric acid and 16 parts of caustic soda solution of 30 per cent. strength and heated for some hours to 60–70° C. After neutralizing, filtering and drying there is obtained a black powder which dyes leather black brown shades. The dyestuff has the formula

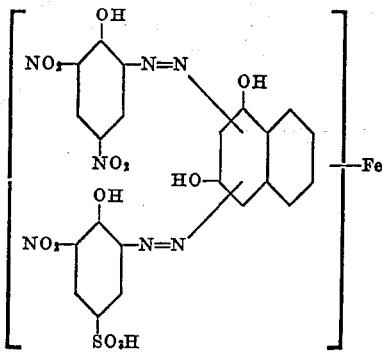

Example 20

A mixture consisting of 23.4 parts of 4-nitro-2-amino-1-phenol-6-sulfonic acid and 22.3 parts of 4-chloro-2-amino-1-phenol-6-sulfonic acid is diazotized in usual manner and coupled with a solution alkaline with sodium carbonate of 16 parts of 1:3-dihydroxynaphthalene. When the formation of dyestuff is complete, the solution is neutralized with hydrochloric acid, the reaction solution heated to 80° C. and mixed with iron-(III)-chloride solution corresponding to 5.6 parts of iron, and 30 parts of crystallized sodium acetate. The whole is boiled for some time in a reflux apparatus. After salting out, filtering and drying there is obtained a metal complex which dyes leather olive tinged black brown shades.

When replacing a part, for example half of the iron by copper, there is obtained a red tinged dark brown shade.

Example 21

29.5 parts of 6-nitro-1-diazo-2-hydroxynaphthalene-4-sulfonic acid are coupled with 16 parts of 1:3-dihydroxynaphthalene in a feebly alkaline medium. 13.3 parts of caustic soda solution and a neutralized diazo solution from 14.35 parts of 4-chloro-2-amino-1-phenol are then added. When coupling is complete, the whole is heated to 50° C. and the disazo dyestuff is separated in usual manner.

30.5 parts of the dyestuff are mixed in 500 parts of water with a quantity of basic chromium sulfate corresponding to 7.6 parts of $Cr_2O_3$ and heated to boiling in a reflux apparatus for 24 hours. After this time the formed chromium compound is salted out, filtered and dried. A blue black powder is obtained which dyes leather red tinged blue grey shades.

When using instead of the 4-chloro-2-amino-1-phenol as second diazo component for example 4-chloroaminonaphthol-6-sulfonic acid, 4-nitroaminophenol-6-sulfonic acid, sulfoanthranilic acid, 6-nitro-1-amino-2-hydroxynaphthalene-4-sulfonic acid, or instead of the chromium a mixture of chromium and iron, there are obtained products which dye leather navy blue to blue black shades. When using iron instead of chromium there are obtained dark brown to black brown dyestuffs.

Example 22

24 parts of the dyestuff from diazotized 4'-nitro-4-aminodiphenylamine-2'-sulfonic acid and 1:3-dihydroxynaphthalene are coupled in a solution alkaline with sodium carbonate with the diazo compound from 6.9 parts of para-nitraniline. When the formation of dyestuff is complete, the solution is worked up in the usual manner. There is obtained a product which dyes leather powerful, medium brown shades.

When using the 4'-nitro-4-aminodiphenylamine-2'-sulfonic acid instead of the para-nitraniline, there is obtained a disazo dyestuff which dyes leather powerful red tinged dark brown shades.

Example 23

100 parts of cotton are introduced at 50° C. into a dye-bath which contains in 2500 parts of water 2 parts of sodium chloride and 1.5 parts of the dyestuff prepared according to Example 3, and the temperature of the bath is gradually raised to 90–95° C. 30 parts of Glaubers salt are added after ¼ hour and dyeing is continued for ¾ hour at this temperature. The bath is then cooled to about 70° C., the necessary quantity of a solution made feebly alkaline with sodium carbonate of complex copper tartrate is added and the material is coppered at 80–90° C. for ½ hour. The cotton is thoroughly rinsed and soaped for a short time, if necessary. It is dyed fast brown shades.

The expression "benzene series" in the following claims will be understood to encompass the benzidine series.

What we claim is:

1. Trisazo dyestuffs of the general formula

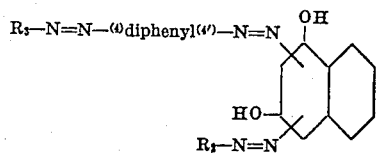

wherein $R_3$ stands for the radical of a coupling component containing the salicyclic acid grouping and $R_2$ stands for the radical of a diazo component containing a member selected from the group consisting of OH and COOH in ortho position to the diazonium group, the said diazo components being selected from group consisting of diazo components of the benzene and naphthalene series.

2. Trisazo dyestuffs of the general formula

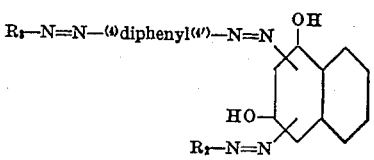

wherein $R_3$ stands for the radical of an ortho-hydroxy benzoic acid and $R_2$ stands for the radical of a diazo component of the benzene series containing a hydroxyl group in ortho-position to the diazonium group.

3. The trisazo dyestuff of the formula

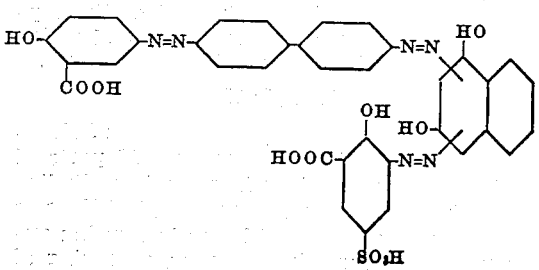

4. The trisazo dyestuff of the formula

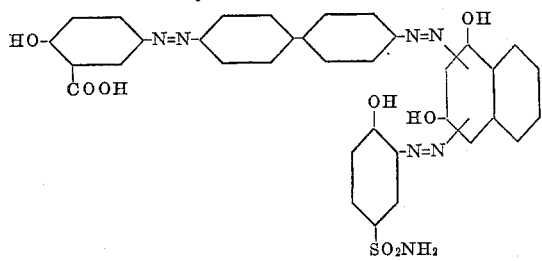

5. Process for the manufacture of trisazo dyestuffs, comprising coupling 1:3-dihydroxynaphthalene with one molecular proportion of diazotized 2-amino-1-hydroxy-4-sulfamide and further with one molecular proportion of the diazoazo compound obtained by one-sided coupling of tetrazotized benzidine and salicylic acid.

6. Process for the manufacture of trisazo dyestuffs, comprising coupling 1:3-dihydroxynaphthalene with one molecular proportion of diazotized 2-amino-1-hydroxybenzene-6-carboxylic-4-sulfonic acid and further with one molecular proportion of the diazoazo compound obtained by one-sided coupling of tetrazotized benzidine and salicylic acid.

FRITZ STRAUB.
JAKOB BRASSEL.
HANS MAYER.